April 30, 1957 V. H. SELIGER 2,790,901

DEMODULATOR

Filed Aug. 28, 1952

INVENTOR.

VICTOR H. SELIGER

BY Victor D. Borst

ATTORNEY

United States Patent Office 2,790,901

Patented Apr. 30, 1957

2,790,901

DEMODULATOR

Victor H. Seliger, Forest Hills, N. Y., assignor to Sperry Rand Corporation, a corporation of Delaware Application August 28, 1952, Serial No. 306,803

6 Claims. (Cl. 250—27)

This invention relates to demodulators or detectors which have particular effectiveness and utility where the disparity between periods of the carrier and signal waves is small.

Most present types of demodulators eliminate the carrier frequency and high-order components of the rectified wave form by integration of the rectified wave form with time. This inevitably results in an undesirable discrimination against the higher-frequency signal components of the demodulated envelope. Such unwanted filtering of the envelope is especially likely to occur where the demodulator is employed in connection with electrical systems which require the detection of modulated carriers having relatively low frequencies with respect to the signal frequency. The amplitude modulated carrier may have a frequency as low as 400 cycles with a modulating signal of 20 cycles. This is a comparatively small differential.

It is an object of this invention, therefore, to provide an improved demodulator circuit for the elimination of the carrier and its higher harmonics.

Another object is to provide an improved demodulator which effectively discriminates between carrier waves and signals impressed thereon, thereby being adapted to improve responses in systems wherein the differences between the frequencies of the carrier and signal waves are relatively small.

Other objects and novel features of the invention will be apparent to one skilled in the electronics art on examination of the specification and claims.

In general, these objects are carried out by addition of the rectified wave form to a wave form simultaneously generated, but differing in polarity; the low-frequency components are accordingly discriminated against by a frequency-selective network. With the resultant cancellation of the carrier, the output takes the form of a demodulated signal which is proportional to the peak voltage of the carrier wave.

The circuit arrangement for effecting demodulation by cancellation of the carrier wave will now be described.

Figure 1:
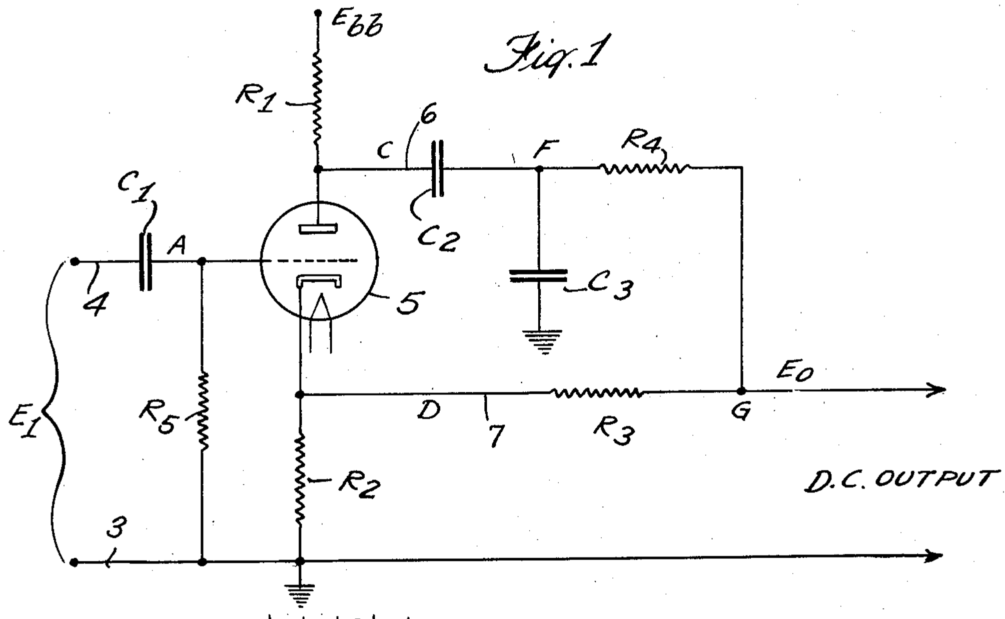
Figure 2A:
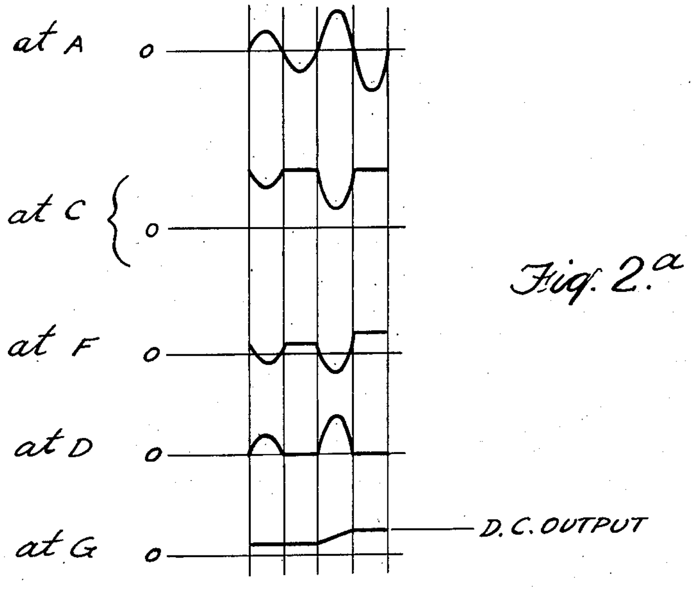

Fig. 1 shows schematically a circuit arrangement embodying the invention;

Fig. 2*a* shows the wave forms of the signal at various points in the circuit.

Figure 2B:
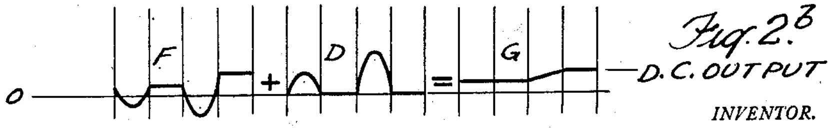

Fig. 2*b* shows the cancellation of the wave forms to yield a D. C. output.

Vacuum tube triode is employed as a demodulator of the cathode-cut-off type in a circuit in which quiescent operating potentials are supplied from a positive direct current supply $E_{bb}$ through plate load resistor $R_1$, from ground through a high value, cathode resistor $R_2$, and from ground through grid resistor $R_5$. Input signals across leads 3 and 4 are coupled through capacitor $C_1$ with negligible attenuation, appearing at point A with the wave form shown in Fig. 2*a*. Due to the high value of the cathode resistor $R_2$, the triode is cut off as soon as its grid-cathode voltage becomes slightly negative, hence cathode cut-off demodulation of the wave form at A occurs, resulting in rectified wave forms at points (C) and (D) such as are shown in Fig. 2*a*.

The triode 5 has a plate branch 6 in which there is provided a capacitor $C_2$ and a resistor $R_4$ in series and a cathode branch 7 having a resistor $R_3$, the plate and cathode branches being joined at point G. A phase adjusting capacitor $C_3$ is connected to the plate branch between the capacitor $C_2$ and the resistor $R_4$ at point F. Because capacitor $C_2$ is a frequency discriminator against low frequencies, the wave form at F will be seen to contain no constant direct current component, it is, therefore, the inverse of the wave form at (D), except that the wave form at (F) is averaged about ground potential, while that at (D) is clamped to ground potential and thus contains low-frequency components proportional to the envelope of the input signal.

The resistors $R_3$ and $R_4$ constitute an adding network whose purpose is to produce at (G) a wave form equal to the sum of the wave forms at (F) and (D). Furthermore, the resistor $R_4$ is provided in order that the plate branch 6 may be made principally resistive so as to maintain the phase opposition of the wave forms in the two branches. A grounded capacitor $C_3$ is provided in the plate branch 6 between the capacitor $C_2$ and the resistor $R_4$ and its function is to effect small changes in the phasing of the wave form at (F). By proper adjustment of the values of the capacitor $C_3$, and the resistors $R_3$ and $R_4$, complete mutual cancellation of the high-frequency components of the wave forms at (F) and (D) can be accomplished, leaving only the low-frequency components from point (D), as shown in Fig. 2*b*, which are the desired reproductions of the input signal envelope. The time constant produced by the capacitor $C_2$ and associated equivalent impedance consisting of the equivalent of the tube 5 and the resistors $R_1$, $R_2$, $R_3$, and $R_4$ should be of the order to twenty times the period of the carrier wave. The time constant is long enough to cause the cancelling pulses of the carrier wave to be in opposite phase, but not long enough to delay output response to changes in input.

The resistors $R_3$ and $R_4$ are approximately equal and are considerably larger than the resistors $R_1$ and $R_2$ to permit normal operation of the triode circuit and to avoid unbalance.

The D. C. output is proportional to the positive peak voltage of the carrier wave. Because long-time constant filtering is avoided the output response is very close to the envelope wave form in the input.

What I claim is:

1. A demodulating circuit comprising a vacuum tube rectifier having a grid, plate and a cathode, plate, cathode and grid resistors, one end of said resistors being connected to the respective electrodes of said tube rectifier, a source of plate potential connected to the other end of said plate resistor, an input circuit having a lead connected to said grid and a lead connected to the other end of said grid and cathode resistors, an output circuit having a plate branch and a cathode branch, one side of said plate branch being connected to the plate between said plate resistor and said plate, one side of said cathode branch being connected to the cathode between said cathode resistor and said cathode, the other side of said branches being joined, reactive means in one of said branches for removing the low frequency components of the rectified current impressed in its branch and a resistor in each of said branches whereby said branches constitute a summing network for canceling the high frequency components of the current placed in phase opposition in said branches.

2. A demodulating circuit as claimed in claim 1 wherein said resistors in the plate and cathode branches are of equal value whereby substantially all the higher frequency components passed by said reactive means are removable in the output circuit.

3. A demodulating circuit as claimed in claim 2 wherein said reactive means is a first capacitor.

4. A demodulator circuit as claimed in claim 2 wherein second reactive means are provided in one of said branches to provide additional phase adjusting means for perfecting the high frequency cancellation in said branches.

5. A demodulating circuit as claimed in claim 4 wherein said second reactive means is a second capacitor, said second capacitor being in the same branch as said first capacitor.

6. A demodulating circuit as claimed in claim 4 wherein said input circuit has a third capacitor connected to the grid of said tube rectifier and said one end of the grid resistor.

References Cited in the file of this patent

UNITED STATES PATENTS

| | | |
|---|---|---|
| 2,178,012 | White | Apr. 8, 1937 |
| 2,222,172 | Dimmick | Nov. 19, 1940 |
| 2,335,265 | Dodington | Nov. 30, 1943 |
| 2,406,882 | Young | Sept. 3, 1946 |